United States Patent [19]

Glaubitt et al.

[11] Patent Number: 5,777,057
[45] Date of Patent: Jul. 7, 1998

[54] VISCOUS LIQUID SUITABLE FOR PRODUCING GEL THREADS OR FIBRES, PROCESS FOR THE PRODUCTION THEREOF AND ITS USE FOR PRODUCING OXIDIC, INORGANIC FIBRES

[75] Inventors: Walther Glaubitt, Veitshöchheim; Rainer Jahn, Würzburg, both of Germany

[73] Assignee: Fraunhofer-Gesellschaft zur Forderung der angewandten Forschung e.V., Munich, Germany

[21] Appl. No.: 544,665

[22] Filed: Oct. 18, 1995

Related U.S. Application Data

[63] Continuation-in-part of Ser. No. 112,580, Aug. 25, 1993, abandoned.

[30] Foreign Application Priority Data

Oct. 5, 1992 [DE] Germany .................. 42 33 477.2

[51] Int. Cl.[6] .................................................. C08G 79/00
[52] U.S. Cl. .......................... 528/9; 528/9; 528/10; 528/26; 528/29; 528/271; 528/395; 528/422
[58] Field of Search ........................ 528/9, 10, 26, 528/29, 271, 395, 422

[56] References Cited

U.S. PATENT DOCUMENTS

| | | | |
|---|---|---|---|
| 4,069,236 | 1/1978 | Hutchinson et al. | 554/76 |
| 4,514,555 | 4/1985 | Taniguchi et al. | 528/9 |
| 4,533,712 | 8/1985 | Taniguchi et al. | 528/9 |
| 4,698,417 | 10/1987 | Morgan | 528/395 |
| 4,976,785 | 12/1990 | Nakano et al. | 106/287.17 |

OTHER PUBLICATIONS

Chemical Abstracts, vol. 116, 1992 199522p.
J. Mater. Sci, 1992, vol. 27, issue No. 6, 1499 to 1504.

*Primary Examiner*—Samuel A. Acquah
*Attorney, Agent, or Firm*—Marshall & Melhorn

[57] ABSTRACT

The invention relates to viscous, aluminium-containing liquids suitable for producing gel threads, filaments or fibres, a process for the production thereof and the use thereof for the production of alumina-containing, inorganic fibres. The liquids according to the invention comprise one or more partly or completely hydrolytically condensable compounds of aluminium and optionally further elements and/or precondensates derived from said compounds. The hydrolytically condensed Al-compounds are derived from compounds of formula (I)

$$Al(OR^*)_3 \qquad (I)$$

in which the radicals R* stand for propyl or butyl in that the $Al(OR^*)_3$ is reacted with an alcohol of formulas (II) or (III):

$$R^1-X-R^2-OH \qquad (II)$$

$$R^1-\overset{\overset{\displaystyle X}{\|}}{C}-R^2-OH \qquad (III)$$

in which $R^1$ stands for an alkyl radical, $R^2$ for an alkylene radical and X is O, S or $NR^3$, with $R^3$ being hydrogen or alkyl. The resulting Al-compounds are complexed with a low molecular weight carboxylic acid and hydrolytically condensed.

17 Claims, 1 Drawing Sheet

APPARATUS FOR THE SYNTHESIS OF SOL-GEL SPINNING MASSES

APPARATUS FOR THE SYNTHESIS OF SOL-GEL SPINNING MASSES

VISCOUS LIQUID SUITABLE FOR PRODUCING GEL THREADS OR FIBRES, PROCESS FOR THE PRODUCTION THEREOF AND ITS USE FOR PRODUCING OXIDIC, INORGANIC FIBRES

This application is continuation-in-part of 08/112,580 filed Aug. 25, 1993 now abandoned.

The invention relates to viscous, aluminium-containing liquids suitable for producing gel threads, filaments or fibres, a process for the production thereof via the sol-gel process and its use for producing alumina-containing, inorganic fibres. From the liquid (solution) according to the invention initially spinnable gel threads or fibres are produced, which are precursors of polycrystalline $\alpha$-$Al_2O_3$ fibres or corresponding fibres from multicomponent oxides.

On the basis of their high strength and high modulus of elasticity fibres are eminently suitable for producing highly stressable bonded fibre fabrics. For this purpose the fibres are used in the form of continuous fibres, long-staple fibres (a few cm to m) or short fibres (up to a few mm), the particular range of use being dependent on the characteristics of the fibres, such as e.g. the fibre length, the number of defects, the tensile strength and the spinning characteristics.

Oxidic, inorganic fibres can e.g. be used for improving the mechanical characteristics of components, for high temperature thermal insulation (asbestos substitute), as catalyst supports or for hot gas filtration (carbon black filters).

The production of inorganic, high temperature-resistant, oxidic fibres and threads, with the exception of whiskers, e.g. takes place from oxidic melts using high temperatures. This has the disadvantage that as a result of the high temperatures high demands are made on the materials of the production equipment and the melted oxides must have specific viscosities and a not too narrow softening range, so that it is possible to draw the threads and fibres. Therefore these melts always contain $SiO_2$ in varying quantities. Thus, it is not possible in this way to produce fibres from e.g. pure $Al_2O_3$.

Processes are also known in which inorganic fibres are produced by spinning spinnable saline or sol solutions through a dry spinning process to salt or gel fibres and subsequently transforming the said fibres into the desired inorganic fibres by a heat treatment at a high temperature. For example, such processes are described in DE-AS 1249832, DE-OS 1494552 and DE-OS 2054573.

However, inorganic saline or sol solutions can only be spun in specific cases, because the solutions used only have an inadequate fibre drawing capacity. By means of a dry spinning process gel fibres are obtained which, baked in a normal atmosphere sinter to polycrystalline fibres. The resulting unsatisfactory fibre qualities prevent a wide-spread technical use of the process (Ullmanns Enzyklopaedie der techn. Chemie, 1976, 11, pp.381 ff.

Considerable research has been carried out over the past two decades in connection with the development and production of $Al_2O_3$ fibres (H. G. Sowman, D. D. Johnson, Oxide fibres from chemical processes, in: Fiber Reinforced Ceramic Composites, Ed. K. S. Mazdiyasni, Noyes Publications. Park Ridge, N.J., 1990, pp.123–140; J. D. Birchall, The preparation and properties of polycrystalline aluminium oxide fibres, Trans. J. Br. Ceram. Soc. 82, 1983, pp.143–149; H. G. Sowman, D. D. Johnson, Ceramic oxide fibres, Cer. Eng. Sci. Proc. 6, 1985, p.1221; G. Winter, Polycrystalline anorganische Faserherstellung, Angew. Chem. 84, 1972, p.866). On the basis of this research three different production processes have been developed enabling $Al_2O_3$ fibres to be produced and which are:

1. Spinning from saline solutions:

A viscous, aqueous solution of pure aluminium salt and an organic polymer is spun to threads and sintered (DE 3447670 C2).

2. Extrusion of suspensions:

By the extrusion of a highly viscous, aqueous $Al_2O_3$ suspension (particle diameter <0.5 μm) threads are obtained.

3. Precursor method (sol-gel process):

From an inorganic or inorganic/organic polymer precursor gel fibres are produced by melt or dry spinning.

The spinnable sols are obtained by the use of aluminium alkoxides, alkyl aluminium compounds, carboxylated aluminium compounds, aluminium acetyl acetonates and triethanol amine-modified aluminium alkoxides in specific combinations. For improving the spinnability it is possible to add high polymer reagents (spinning aids) such as polyethylene oxide. In this way e.g. $Al(Obu^*)_3$ is reacted with triethanol amine (JP 01278414 A2: Preparation of alumina fiber from aluminium alkoxide, Colloid Research Institute, Japan). Through the use of trifunctional amine it is possible to form larger molecular units, which when hydrolyzed and condensed react to a spinning mass.

For carboxylation purposes use is e.g. made of oxalic acid (Process for producing $Al_2O_3$ filament yarn, Intermediate Report of the BMFT project 03 M 104 0 A 4, AKZO Chemie, Research Laboratories, Obernburg, 1991) or citric acid (Nishio, Toshiyuki; Fujiki, Yoshinori; Preparation of ceramic fibers by a precursor method, Part 1, Alumina fiber. Nippon Seramikkusu kyokai Gakujutsu Ronbunshi, 98 (11), pp.1223–30, 1990).

High molecular weight monocarboxylic acids, e.g. stearic acid are used for the partial complexing of alkyl aluminium compounds (DE-OS 2408122). As a function of the process variant, the solvent is constituted by dioxane, toluene, benzene, etc., which must be looked upon as problematical in view of the importance attached to the protection of the environment.

DE-OS 2325575 discloses a process for the production of aluminium oxide-based fibres using the dry spinning process, in which the salt or gel fibres are contacted prior to heat treatment with a solution or dispersion of polyvinyl acetate and optionally a plasticizer.

In addition, DE-OS 2127418 discloses viscous, metalorganic solutions, which are suitable for producing inorganic, oxidic, high temperature-resistant threads and fibres, whilst DE 27 32290 C2 describes a process for producing polycrystalline oxide fibres.

However, all these processes suffer from the disadvantage that they are expensive, complicated or are not compatible with modern environmental protection requirements and/or only supply fibres which have an unsatisfactory quality. Requirements which must be fulfilled by the fibres are e.g. considerable lengths, a limited number of defects, high tensile strength and good spinning characteristics.

The problem of the present invention was therefore to provide a process enabling the production of inorganic, oxidic, polycrystalline and high temperature-resistant fibres, filaments or threads having an alumina base, which can be made available in considerable lengths (long fibres), have a limited number of defects, high tensile strength characteristics and good spinning properties. In addition, the process must be easy and universal to use and inexpensive to perform. In particular the problem of the present invention was to make available in a simple and inexpensive manner a universally usable sol solution, which has a high thread drawing capacity and which is suitable for the production of spinnable gel fibres, which are to serve as precursors for the production of the aforementioned fibres.

According to the invention this problem is solved by viscous liquids, which comprise one or more partly or completely hydrolytically condensed compounds of aluminium and optionally other elements from the group Ca, Mg, B, Si, transition metals, lanthanides and actinides and/or pre-condensates derived from the aforementioned compounds, in which the hydrolytic condensation is optionally performed in the presence of a catalyst and/or a solvent by the action of water, moisture or water formed by esterification. This viscous solution is characterized in that it contains partly or completely hydrolytically condensed compounds of aluminium, which can be derived from the aluminium alkoxides of formula (I)

  (I)

in which the R* radicals are the same or different and stand for propyl, ethyl or butyl, and/or can be derived from aluminium alkoxides of formula (I) obtained in situ from aluminium compounds, in that Al(OR*)$_3$ is reacted with 0.5 to 2.5 mole, based on 1 mole of Al(OR*)$_3$, of an alcohol or a mixture of alcohols of formulas (II) or (III)

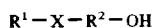  (II)

  (III)

in which R$^1$ is a straight-chain, branched or cyclic alkyl radical with 1 to 10 C-atoms, R$^2$ an alkylene radical with 2 to 4 C-atoms and X is O, S or NR$^3$, with R$^3$ being hydrogen or alkyl with 1 to 4 C-atoms and that the resulting aluminium compounds are complexed (carboxylated) with 3 to 7 mole, based on 1 mole of Al(OR*)$_3$ of a carboxylic acid, a mixture of carboxylic acids or the corresponding anhydrides and the complexed aluminium compounds are hydrolytically condensed.

It has surprisingly been found that aluminium compounds of formula (I) do not gel following the addition of low molecular weight carboxylic acids if previously reacted with alcohols of formulas (II) or (III). After adding water and following hydrolytic condensation surprisingly spinnable oligomer solutions were obtained from which it is possible to obtain spinnable gel fibres and in some cases even continuous fibres having the desired characteristics.

It has surprisingly been found that by the reaction of Al compounds of formula (I) with alcohols of formulas (II) and (III) Al compounds are obtained, which can without difficulty be carboxylated, hydrolyzed and condensed.

However, the direct reaction of aluminium compounds of formula (I), e.g. Al(OBu*)$_3$, with carboxylic acids leads to solid, insoluble gels having no fibre-forming capacity. The formation of sparingly soluble aluminium, compounds can also not be prevented by adding suitable solvents. Even without the addition of a carboxylic acid, solvents such as unbranched, lower alcohols or ketones react with aluminium compounds of formula (I) to give precipitates. Although it is easily possible to admix isopropanol, dioxane, tetrahydrofuran, ethyl acetate, chloroform, toluene or triisobutyl amine, they do not prevent the formation of solid aluminium compounds during acid addition.

It is assumed that in the production of the spinning mass according to the invention one of the three reaction-kinetic-similar and sterically undemanding alkoxide groups in the compound Al(OR*)$_3$ (i) is replaced by a reaction-kinetic-different and sterically more demanding alkoxy group of type R$^1$-X-R$^2$—O— (formula (II)) or R$^1$-CX-R$^2$—O— (formula (III)) and that the carboxylic acid complexes the resulting aluminium compound of type Al(OR*)$_2$(O—R$^2$-X-R$^1$) or Al(OR*)$_2$(O—R$^2$-CX-R$^1$).

This is surprising and is contrary to expectations, because with identical silicon compounds this replacement does not take place. For example, here i-PrOEtOH and n-BuOEtOH are used as solvents.

As a result of experimental findings it is assumed that following carboxylation there is only 6x-coordinated aluminium and that not all the alkoxy groups of the aluminium are displaced by carboxylate groups. Otherwise sparingly soluble aluminium carboxylate would be obtained, which no longer has any fibre drawing characteristics. This is also surprising and contrary to expectations.

Experimental findings (IR-spectroscopic analyses, $^{27}$Al-NMR) enable the conclusion to be drawn that the carboxylate groups are not hydrolyzed, that after hydrolysis the aluminium is only 4x coordinated and that carboxylate groups are linked in bridging and chelating manner with the aluminium atoms. This result is also surprising, because the literature only discloses chelating aluminium-carboxylate groups.

Therefore what appears to be decisive for the formation of a spinnable sol is the correct graduation of the chemical reactivities of the substituent on the Al central atom. Apart from steric effects, this could be the reason why through the varyingly rapidly reacting starting groups a compound is obtained, which can then be easily carboxylated, hydrolyzed and condensed.

A further major advantage of the invention is that the production of the spinning mass takes place in a batch reaction. Aluminium sec. butylate is e.g. a commercially readily available, liquid compound, which can be processed in ambient air without further solvent addition.

Another advantage of the invention is that problematical solvent additions such as dioxane, toluene, etc. are not necessary. In addition, the chemical modification necessary for fibre production takes place without any addition of a catalyst at ambient temperature and accompanied by simple stirring.

Carboxylation is equally easy. The particular carboxylic acid is slowly added to the batch accompanied by stirring at ambient temperature and the water necessary for hydrolysis can be introduced in chemically uncombined form, e.g. in vaporous form, at ambient temperature, without precipitation occurring. This leads to a crystal-clear, colourless, molecularly dispersed spinning mass, which can be spun to continuous gel filaments without any spinning aids. Due to the use of carboxylic acids, the gel filaments have a high theoretical Al$_2$O$_3$ content of up to 34%. Thus, the spinning mass contains a low, organic proportion, so that in the case of thermolysis of the gel filaments (to the oxidic fibres) shrinkage is reduced. In the preferred embodiment the spinning mass is not toxic and can be stored at ambient temperature for a year without precipitating. The phase transition to α-Al$_2$O$_3$ occurs at a temperature of approximately 1125° C. and fibres with a diameter of <20 μm are obtained. Gel filaments for producing fibres from multicomponent oxides are obtainable by stoichiometric addition of corresponding metal alkoxides.

The R* radicals of formula (I) are alkyl groups with three or four carbon atoms, preference being given to the s-butyl or i-butyl group, which gives particularly results.

Preferred embodiments of the alkoxides of formulas (II) or (III) are i-C$_3$H$_7$—O—C$_2$H$_4$—OH, n-C$_4$H$_9$—O—C$_2$H$_4$—OH, C$_2$H$_5$—NH—C$_2$H$_4$—OH, C$_2$H$_5$—S—C$_2$H$_4$—OH, CH$_3$—CO—CH$_2$—OH, CH$_3$—CO—CH(CH$_3$)—OH or C$_2$H$_5$—CO—CH$_2$—OH.

especially good results being obtained with n-C₄H₉—O—C₂H₄—OH and i-C₃H₇—C₂H₄—OH.

The carboxylic acids for complexing the compounds "Al(OR*)₂ (O—R₂-X-R¹)" or "Al(OR*)₂ (O—R²-CX-R¹)" are added in quantities between 3 and 7 mole, based on 1 mole of Al(OR*)₃, preference being given to 5 mole, which leads to especially good results.

Carboxylic acids for complexing the compounds "Al (OR*)₂(O—R²-X-R¹)" or "Al(OR*)₂(O—R²-CX-R¹)" are those having 1to 26 carbon atoms. Preference is given to propionic, valeric, caproic, cerstinic or caprylic acid or a mixture thereof. Acetic acid alone is less suitable, but is also very suitable when mixed with other acids. Particularly good results are obtained with propionic acid or a mixture of caproic and propionic acid. The carboxylic acids can also be added in the form of their anhydrides. The carboxylic acids are used not only as a carboxylating agent, but also function as a polar solvent.

The hydrolytic condensation of the Al-containing solution is performed by the action of water or moisture optionally accompanied by the addition of a catalyst and/or solvents.

For controlled hydrolysis use can e.g. be made of an apparatus, which conducts moist air with a set water vapour partial pressure into the spinning mass the initiation and further advance of the condensation reaction is made noticeable by a viscosity rise in the sol and is observed at a constant stirring speed by the corresponding torque rise of the stirrer.

Figure 1:
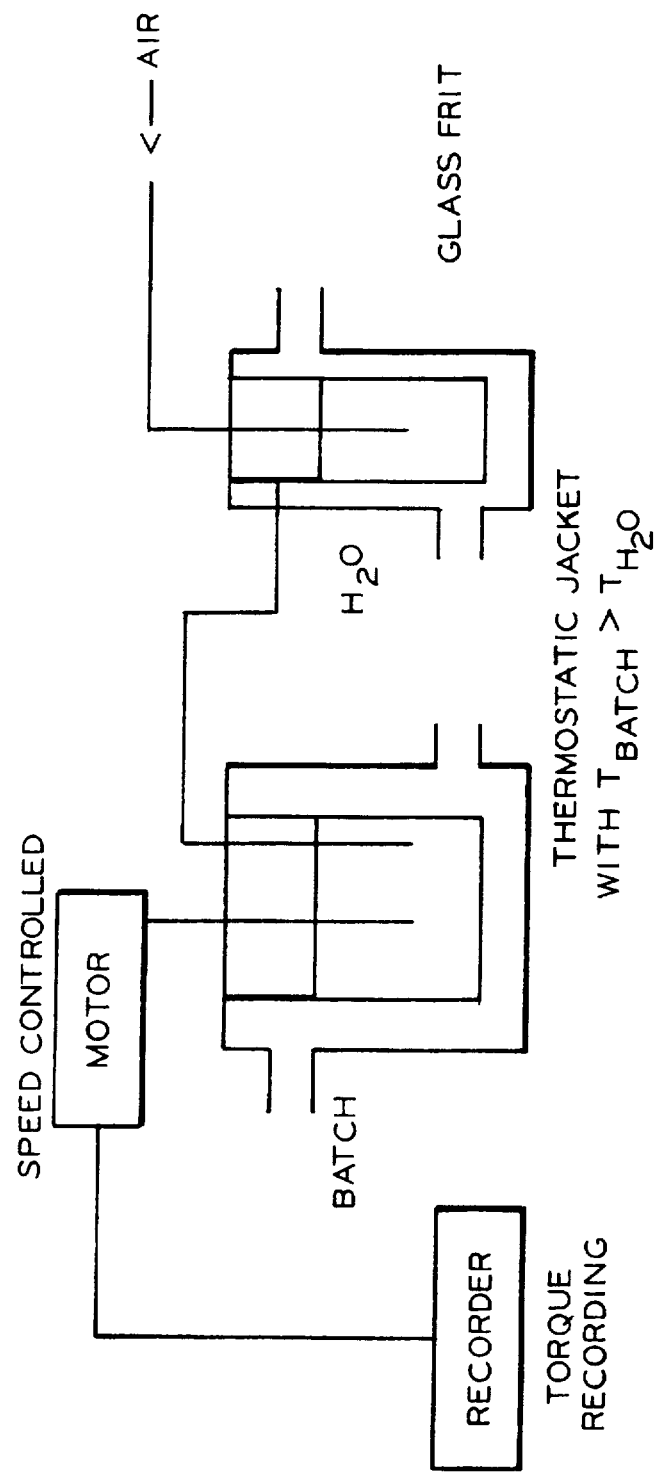
FIG. 1 shows the apparatus for producing the spinning mass according to the invention, which passes via the sol-gel process.

A spinnable sol is obtained after a reaction time of three to four days, the viscosity constantly increasing and reaching a limit of approximately 2000 Pas. The sols according to the invention are spinnable when their viscosity approaches this limit and in the shear jump test they have an excellent structurally viscous behaviour, which indicates enisotropic, stretched, oligomeric structural units.

The setting of a viscosity adapted to the particular application can optionally also take place through the addition of an inert solvent.

By adding suitable heteroalkoxides in corresponding concentration, the process according to the invention also makes it possible to produce spinning masses for obtaining fibres from multicomponent oxides, e.g. from pure mullite or spinel.

Thus, the Al-containing solution according to the invention can, prior to hydrolytic condensation, be supplied with one or more hydrolytically condensable compounds, optionally in precondensed form, such as e.g. silicon compounds of formula (IV)

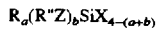

(IV)

in which the radicals R, R" and Z are the same or different and have the following meanings:

R=alkyl, alkenyl, aryl, alkylaryl or arylalkyl,

R"=alkylene or alkenylene, said radicals being interruptible by oxygen or sulphur atoms or —NH— groups, X=hydrogen, halogen, hydroxy, alkoxy, acyloxy, alkylcarbonyl, alkoxycarbonyl or NR'₂, with R'=hydrogen, alkyl or aryl, Z=halogen or an optionally substituted amino, amide, aldehyde, alkylcarbonyl, carboxy, mercapto, cyano, alkoxy, alkoxycarbonyl, sulphonic acid, phosphoric acid, acryloxy, methacryloxy, epoxy or vinyl group.

a=0, 1, 2 or 3, b=0, 1, 2 or 3, with a+b=1, 2 or 3.

Such silanes are e.g. described in DE 34 07 087 C2. The alkyl radicals are e.g. straight-chain, branched or cyclic radicals with 1 to 20 and preferably 1 to 10 carbon atoms and particular preference is given to lower alkyl radicals with 1 to 6 carbon atoms. Specific examples are methyl, ethyl, n-propyl, i-propyl, n-butyl, s-butyl, t-butyl, i-butyl, n-pentyl, n-hexyl, cyclohexyl, 2-ethylhexyl, dodecyl and octadecyl.

The alkenyl radicals are e.g. straight-chain, branched or cyclic radicals with 1 to 20, preferably 2 to 10 carbon atoms and particular preference is given to lower alkenyl radicals with 2 to 6 carbon atoms, such as e.g. vinyl, allyl or 2-butenyl.

Preferred aryl radicals are phenyl, diphenyl and naphthyl.

The alkoxy, acyloxy, alkylcarbonyl, alkoxycarbonyl and amino radicals are preferably derived from the aforementioned alkyl and aryl radicals. Specific examples are methoxy, ethoxy, n and i-propoxy, n, i, s and t-butoxy, methylamino, ethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl and tolyl.

Said radicals can optionally carry one or more substituents e.g. halogen, alkyl, hydroxyalkyl, alkoxy, aryl, aryloxy, alkylcarbonyl, alkoxycarbonyl, furfuryl, tetrahydrofurfuryl, amino, alkylamino, dialkylamino, trialkylammonium, amido, hydroxy, formyl, carboxy, mercapto, cyano, nitro, epoxy, SO₃H and PO₄H₂.

The non-hydrolyzable radicals of the Si-compound (IV) influence the characteristics of the precursor threads and in particular the latter are stabilized. Thus, e.g. (meth)acrylic groups lead to a cross-linking and aryl groups reduce brittleness. During the subsequent thermal treatment of the precursor threads all the "organics" are removed and consequently said groups influence the structure formation (porosity, density) of the resulting fibres.

As further hydrolytically condensable components can be added to the reaction medium one or more soluble aluminium, titanium or zirconium compounds of the following formulas and optionally in precondensed form:

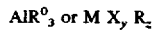

in which M stands for titanium or zirconium, the radicals R⁰, R and X being the same or different, R⁰ standing for halogen, hydroxy, alkoxy or acyloxy, Y is an integer from 1 to 4, particularly 2 to 4, z stands stands for 0, 1, 2 or 3, preferably 0, 1 or 2 and X and R are defined in the same way as for formula (IV). With respect to the preferred definitions of these radicals, reference can be made to the statements in conjunction with the suitable hydrolyzable silicon compounds. The aforementioned groups can also be wholly or partly replaced by chelate ligands (e.g. acetyl acetone or ethyl acetate, acetic acid). Particularly preferred Al-compounds are Al-alkoxides and halides, specific examples being Al(OCH₃)₃, Al(OC₂H₅)₃, AlCl₃ or AlCl (OH)₂.

Preferably the Ti and Zr-compounds are those in which y is equal to 4. As in the case of the aforementioned Al-compounds, it is also possible to use complexed Ti or Zr-compounds. Further preferred complexing agents are acrylic and methacrylic acid. Specific examples for usable Zr and Ti-compounds are: TiCl₄, Ti(OC₂H₅)₄, Ti(OC₃H₇)₄, Ti(O-i-C₃H₇)₄, Ti(OC₄H₉)₄, Ti(2-ethylhexoxy)₄, $Zr(OC_2H_5)_4$, $Zr(O-i-C_3H_7)_4$, $Zr(OC_3H_7)_4$, $Zr(OC_4H_9)_4$, $Zr(2-ethylhexoxy)_4$, $ZrCl_4$ and $ZrOCl_2$.

Further hydrolyzable compounds, which can be used for producing the spinning mass according to the invention are e.g. boron trihalides and borates, such as e.g. $BCl_3$, $B(OCH_3)_3$ and $B(OC_2H_5)_3$.

The following table reveals the extent of thread formation of certain spin solutions according to the invention. The thread formation capacity was tested, with three exceptions, at ambient temperature using the glass rod drawing test. Rating:

1 - optically structure-free continuous thread, length) 10 m
2 - surface-structured continuous thread, length) 10 m
3 - gel thread, length) 1 m
4 - gel thread, length) 10 cm
5 - gel thread, length) 1 cm.

The spinning masses J and N were drawn to threads at 50° C. and the spinning mass 0° at 100° C.

| Thermostat-Temperature | 45° C. | 55° C. | 65° C. | 75° C. |
|---|---|---|---|---|
| Winding speed at 2 MPa spinning pressure | 10 m/min | 20 m/min | 60 m/min | |
| Winding speed at 3 MPa spinning pressure | | 25 m/min | 100 m/min | 200 m/min |

The process according to the invention will now be illustrated by the following performance examples.

EXAMPLE 1

246.3 g (1.00 mole) of aluminium sec. butylate were mixed with 104.1 g (1.00 mole) of isopropoxyethanol. After stirring for 30 min 370.4 g (5.00 mole) of propionic acid were added, accompanied by stirring, slowly to the solution in such a way as to maintain a temperature of <25° C. After stirring for 1 hour steam-containing air was introduced

| Material components | Material proportions in mole, 0.05 mole batches | | | | | | | | | | | | | |
|---|---|---|---|---|---|---|---|---|---|---|---|---|---|---|
| Al(OBu')$_3$ | 1 | 1 | 1 | 1 | 1 | 1 | 1 | 1 | 1 | 1 | 1 | 1 | 1 | 1 |
| i-PrOEtOH | — | — | 1 | — | — | — | 1 | — | — | — | — | — | 1 | 1 |
| n-BuOEtOH | 1 | 1 | — | 1 | 1 | .5 | — | 1 | 1 | 1 | 1 | 1 | — | — |
| Propionic acid | 1 | — | — | — | — | — | — | — | — | — | 3.5 | 5 | 5 | 4 |
| Valeric acid | — | 1 | — | — | — | — | — | — | — | — | — | — | — | — |
| Caproic acid | — | — | 1 | 1 | .5 | .5 | — | — | 4 | 5 | 1.5 | — | — | — |
| Caprylic acid | — | — | — | — | — | — | 1 | 1 | — | — | — | — | — | — |
| Spinning mass | A | B | C | D | E | F | G | H | J | K | L | M | N | O |
| Rating | 5 | 5 | 5 | 4 | 5 | 5 | 5 | 4 | 1 | 1 | 1 | 2 | 3 | 1 |

The following Table contains the $Al_2O_3$ content of the spinning masses used

| Spinning mass | A | B | C | D | E | F | G |
|---|---|---|---|---|---|---|---|
| $Al_2O_3$ - content [%] | 11.6 | 10.9 | 10.9 | 10.6 | 12.0 | 14.0 | 10.3 |

| Spinning mass | H | J | K | L | M | N | O |
|---|---|---|---|---|---|---|---|
| $Al_2O_3$ - content [%] | 10.0 | 6.2 | 5.4 | 6.4 | 6.9 | 7.1 | 7.9 |

To show that the spinning mass according to the invention can be used for an industrial production process, spinning tests were carried out on an industrial dry spinning plant in the form of a piston-type dry spinning apparatus with a heatable drying shaft and a carrier gas heating regulatable up to 250° C. The spinning cylinder is designed for small volumes (1700 cm$^3$) end a maximum spinning pressure of 10 MPa and can also be heated. For the better control of the spinning process a heatable nozzle head was subsequently installed.

The spinning tests were carried out with masses of composition Al(OBu*)$_3$/i-PrOEtOH/propionic acid in a molar ratio of 1:1:5. This spinning mass has structurally viscous flow characteristics and a marked temperature dependence of the viscosity. Spinning tests were carried out as a function of the spinning pressure and temperature. Monofilaments up to 1000 m long were drawn and an attempt was made in each case to set the maximum winding speed which could be achieved up to thread break. A clear dependence was established between the temperature and the winding speed. The following Table shows the maximum winding speeds at 2 and 3 MPa spinning pressure and different mass temperatures.

through a glass tube at a constant high stirrer speed (e.g. 400 r.p.m.). Roughly 3 days later when the torque of the stirrer motor used had reached a limit value, it was switched off and the crystal-clear, colourless spinning mass was heated to 50° C., so that the enclosed air can rise and a bubble-free spinning mass can be obtained. The spinning mass was heated to e.g. 50° C. to improve the flowability, filled into a conventional spinning plant and spun to kilometer-long monofilaments at a drawing-off speed of up to 200 m/min. The gel thread was-subsequently sintered and was converted at temperatures around 1120° C. into $\alpha$-$Al_2O_3$ fibres. The spinning mass could be stored in stable manner for over a year.

EXAMPLE 2

246.3 g (1.00 mole) of aluminium sec. butylate were mixed with 104.1 g (1.00 mole) of isopropoxyethanol. After stirring for 30 min 222.2 g (3.00 mole) of propionic acid were added, accompanied by stirring, slowly to the solution so as to maintain a temperature of <25° C., after which 121.0 g (2.00 mole) of a cetic acid were added dropwise. After stirring for 1 hour steam-containing air was introduced through a glass tube at a constant high stirrer speed (e.g. 400 r.p.m.) and then the further procedure was as described in example 1.

EXAMPLE 3

246.3 g (1.00 mole) of aluminium sec. butylate were mixed with 118.0 g (1.00 mole) of n-butoxyethanol. After stirring for 30 min 580.8 g (5.0 mole) of caproic acid were slowly added to the solution, accompanied by intense stirring in such a way that a temperature of <25° C. could be maintained. The batch was then processed as in example 1.

EXAMPLE 4

246.3 g (1.00 mole) of aluminium sec. butylate were mixed with 88.6 g (0.75 mole) of n-butoxyethanol. After stirring for 30 min a mixture of 174.0 g (1.5 mole) of caproic acid and 259.2 g (3.5 mole) of propionic acid were slowly added to the solution, accompanied by intense stirring, so as to maintain a temperature of <25° C. The batch was then further processed as in example 1.

EXAMPLE 5

246.3 g (1.00 mole) of aluminium sec. butylate were mixed with 118.0 g (1.00 mole) of n-butoxyethanol. After stirring for 30 min a mixture of 348.4 g (3.0 mole) of caproic acid and 120.0 g (2.0 mole) of acetic acid were slowly added to the solution, accompanied by intense stirring, in such a way that a temperature of <25° C. was maintained. The batch was then processed as in example 1.

EXAMPLE 6

246.3 g (1.00 mole) of aluminium sec. butylate were mixed with 118.0 g (1.00 mole) of n-butoxyethanol. After stirring for 30 min 370.4 g (5.0 mole) of propionic acid were slowly added, accompanied by intense stirring in such a way as to maintain a temperature of <25° C. The batch was then further processed as in example 1.

EXAMPLE 7

269.5 g (1.50 mole) of aluminium sec. butylate were mixed with 156.2 g (1.00 mole) of isopropoxyethanol. After stirring for 30 min 555.6 g (7.50 mole) of propionic acid were slowly added to the solution, accompanied by intense stirring, so as to maintain a temperature of <25° C. This was followed by the dropwise addition of 208.3 g (1.00 mole) of tetraethoxysilane. The batch was then further processed as in example 1. It led to a gel thread, which can be transformed at 980° C. into pure mullite (3 $Al_2O_3$* 2 $SiO_2$).

We claim:

1. A viscous liquid for producing gel threads or fibres, said liquid prepared by a process comprising the steps of:

(a) providing an aluminum compound of formula (I)

$$Al(OR^*)_3 \quad (I)$$

in which the radicals R* is the same or different and stand for propyl or butyl;

(b) reacting the Al(OR*)$_3$ of formula (I) with 0.5 to 2.5 mole, based on 1 mole of Al(OR*)$_3$ of an alcohol or a mixture of alcohols of formulas (II) or (III):

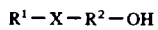

$$R^1-X-R^2-OH \quad (II)$$

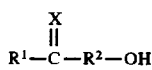

$$R^1-\overset{\overset{X}{\|}}{C}-R^2-OH \quad (III)$$

in which $R^1$ is a straight-chain, branched or cyclic alkyl radical with 1 to 10 C-atoms, $R^2$ an alkylene radical with 2 to 4 C-atoms and X stands for O, S or $NR^3$, with $R^3$ being hydrogen or alkyl with 1 to 4 C-atoms;

(c) adding to the resulting reaction mixture 3 to 7 moles, based on 1 mole of Al(OR*)$_3$, a carboxylic acid having 1 to 26 carbon atoms, a mixture of carboxylic acids, or the corresponding anhydrides to form a complexed aluminum compound; and (d) hydrolytically condensing said complexed aluminum compound to form a viscous liquid, said viscous liquid suitable for further processing to produce gel threads or fibers.

2. A process for making a viscous liquid for producing gel threads or fibres, said process comprising the steps of:

(a) providing an aluminum compound of formula (I)

$$Al(OR^*)_3 \quad (I)$$

in which the radicals R* is the same or different and stands for propyl or butyl;

(b) reacting the Al(OR*)$_3$ of formula (I) with 0.5 to 2.5 mole, based on 1 mole of Al(OR*)$_3$ of an alcohol or a mixture of alcohols of formulas (II) or (III):

$$R^1-X-R^2-OH \quad (II)$$

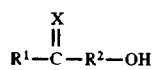

$$R^1-\overset{\overset{X}{\|}}{C}-R^2-OH \quad (III)$$

in which $R^1$ is a straight-chain, branched or cyclic alkyl radical with 1 to 10 C-atoms, $R^2$ an alkylene radical with 2 to 4 C-atoms and X stands for O, S or $NR^3$, with $R^3$ being hydrogen or alkyl with 1 to 4 C-atoms;

(c) adding to the resulting reaction mixture 3 to 7 moles, based on 1 mole of Al(OR*)$_3$, carboxylic acid having 1 to 26 carbon atoms, a mixture of carboxylic acids, or the corresponding anhydrides to form a complexed aluminum compound; and (d) hydrolytically condensing said complexed aluminum compound to form a viscous liquid, said viscous liquid suitable for further processing to produce gel threads or fibers.

3. Viscous solution according to claim 1, characterized in that R* in formula (I) stands for s-butyl or i-butyl.

4. Viscous solution according to claim 1, characterized in that the alcohol of formulas (II) or (III) is
i-$C_3H_7$—O—$C_2H_4$—OH, n-$C_4H_9$—O—$C_2H_4$—OH, $C_2H_5$—NH—$C_2H_4$—OH, $C_2H_5$—S—$C_2H_4$—OH, $CH_3$—CO—$CH_2$—OH, $CH_3$—CO—CH($CH_3$)—OH or $C_2H_5$—CO—$CH_2$—OH.

5. Viscous solution according to claim 1, characterized in that the carboxylic acid is propionic, valeric, caproic, cerotinic, or caprylic acid, or an acid mixture containing acetic acid.

6. Viscous solution according to claim 1, characterized in that it contains as further hydrolytically condensed compounds one or more compounds derived by hydrolytic condensation of silicon compounds of formula (IV), optionally in precondensed form,

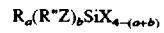

$$R_a(R"Z)_b SiX_{4-(a+b)} \quad (IV)$$

in which the radicals R, R" and Z are the same or different and have the following meanings:

R=alkyl, alkenyl, aryl, alkylaryl or arylalkyl,

R"=alkylene or alkenylene, said radicals being interruptible by oxygen or sulphur atoms or —NH— groups, X=hydrogen, halogen, hydroxy, alkoxy, acyloxy, alkylcarbonyl, alkoxycarbonyl or NR'2, with R'=hydrogen, alkyl or aryl, Z=halogen or an optionally substituted amino, amide, aldehyde, alkylcarbonyl, carboxy, mercapto, cyano, alkoxy, alkoxycarbonyl, sulphonic acid, phosphoric acid, acryloxy, methacryloxy, epoxy or vinyl group, a=0, 1, 2 or 3, b=0, 1, 2 or 3, with a+b=1, 2 or 3.

7. Viscous solution according to claim 1, characterized in that it contains as further hydrolytically condensed compounds one or more compounds selected from the group consisting of aluminum, titanium and zirconium compounds soluble in the reaction medium and optionally in precondensed form of formula $$AlR^o3 \text{ or } M X_y R_z,$$

in which M stands for titanium or zirconium, $R^o$ standing for halogen, hydroxy, alkoxy or acyloxy, Y is an integer from 1 to 40, z stands for 0, 1, 2 or 3, and X is defined as hydrogen, halogen, hydroxy, alkoxy, acyloxy, alkylcarbonyl, alkoxycarbonyl or $NR^12$, where $R^1$ stands for hydrogen, alkyl or aryl, R is defined as alkyl, alkenyl, aryl, alkylaryl or arylalkyl.

8. Process according to claim 2, characterized in that use is made of aluminium compounds of formula (1), in which R* stands for s-butyl or i-butyl.

9. Process according to claim 2, characterized in that the alcohol of formulas (II) or (III) used is:

$i-C_3H_7$—O—$C_2H_4$—OH, $n-C_4H_9$—O—$C_2H_4$—OH, $C_2H_5$—NH—$C_2H_4$—OH, $C_2H_5$—S—$C_2H_4$—OH, $CH_3$—CO—$CH_2$—OH, $CH_3$—CO—$CH(CH_3)$—OH or $C_2H_5$—CO—$CH_2$—OH.

10. Process according to claim 2, characterized in that the carboxylic acid used is propionic, valeric, caproic, cerotinic, or caprylic acid, or an acid mixture which contains acetic acid.

11. A process according to claim 2 characterized in that as further hydrolytically condensable compounds use is made of one or more compounds of the following formula $$R_a(R"Z)_b SiX_{4-(a+b)}$$

in which:

R=alkyl, alkenyl, aryl, alkylaryl or arylalkyl,

R=alkylene or alkenylene, said radicals being interruptible by oxygen or sulphur atoms or —NH— groups, X=hydrogen, halogen, hydroxy, alkoxy, acyloxy, alkylcarbonyl, alkoxycarbonyl or $NR^12$, with $R^1$=hydrogen, alkyl or aryl, Z=halogen or an optionally substituted amino, amide, aldehyde, alkylcarbonyl, carboxy, mercapto, cyano, alkoxy, alkoxycarbonyl, sulphonic acid, phosphoric acid, acryloxy, methacryloxy, epoxy or vinyl group, a=0, 1, 2 or 3, b=0, 1, 2 or 3, with a+b=1, 2 or 3.

12. A process according to claim 2 characterized in that as further hydrolytically condensable components use can be made of one or more aluminum, titanium or zirconium compounds soluble in the reaction medium, optionally in precondensed form, of formula:

$$AlR^o3 \text{ or } M X_y R_z,$$

in which M stands for titanium or zirconium, $R^o$ standing for halogen, hydroxy, alkoxy or acyloxy, y is an integer from 1 to 4, z stands for 0, 1, 2 or 3, and X is defined as hydrogen, halogen, hydroxy, alkoxy, acyloxy, alkylcarbonyl, alkoxycarbonyl, or $NR^12$, where $R^1$ stands for hydrogen, alkyl or aryl, R is defined as alkyl, alkenyl, aryl, alkylaryl or arylalkyl.

13. Process according to claim 2, characterized in that water vapour-containing air is blown into the mixture of the complexed aluminium compounds and optionally the further condensable components for hydrolytic condensation and for setting the desired viscosity.

14. A process according to claim 2, wherein said process includes compounds from the group Ca, B, Mg, Si, transition metals, lanthanides and actinides or precondensates thereof.

15. A process according to claim 2, wherein a solvent is added to said reaction mixture to lower the final viscosity.

16. A process according to claim 7, wherein Y is an integer from 2 to 4 and Z stands for 0, 1, or 2.

17. A process according to claim 12, wherein Y is an integer from 2 to 4 and Z stands for 0, 1, or 2.

* * * * *